United States Patent
Tseng et al.

(10) Patent No.: US 7,999,904 B2
(45) Date of Patent: Aug. 16, 2011

(54) FLAT DISPLAY PANEL

(75) Inventors: Te-Hai Tseng, Hsin-Chu (TW); Wei-Li Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 654 days.

(21) Appl. No.: 11/748,486

(22) Filed: May 14, 2007

(65) Prior Publication Data

US 2008/0158467 A1 Jul. 3, 2008

(30) Foreign Application Priority Data

Dec. 29, 2006 (TW) ................................ 95149871 A

(51) Int. Cl.
*G02F 1/1333* (2006.01)
(52) U.S. Cl. ........................................ 349/158; 349/160
(58) Field of Classification Search .................. 349/158, 349/160
See application file for complete search history.

(56) References Cited

U.S. PATENT DOCUMENTS

| | | | |
|---|---|---|---|
| 4,934,067 A * | 6/1990 | Wedel | 34/457 |
| 6,784,969 B1 * | 8/2004 | Lim | 349/189 |
| 2004/0233379 A1 * | 11/2004 | Kinoshita et al. | 349/158 |

FOREIGN PATENT DOCUMENTS

| | | |
|---|---|---|
| JP | 53-025398 | 3/1978 |
| JP | 05-281568 | 10/1993 |
| JP | 2000-098395 | 4/2000 |
| JP | 2002-057280 | 2/2002 |

* cited by examiner

*Primary Examiner* — Phu Vu
(74) *Attorney, Agent, or Firm* — Winston Hsu; Scott Margo

(57) ABSTRACT

A flat display panel includes a first substrate and a second substrate adhered to the first substrate. The first substrate has a display region, and a peripheral region located on at least one side of the first substrate. The peripheral region includes a driving IC connection region. The second substrate has a main region corresponding to and covering the display region of the first substrate, and at least one extension region protruding from the main region and covering a portion of the peripheral region.

9 Claims, 13 Drawing Sheets

FLAT DISPLAY PANEL

BACKGROUND OF THE INVENTION

1. Field of the Invention

The invention relates to a flat display panel, and more particularly, to a flat display panel having a design for strengthening peripheral structures.

2. Description of the Prior Art

Compared with a traditional non-flat display panel, such as cathode ray tube display, a flat display panel has been a mainstream product in the market because of having the characteristics of lightweight and thin thickness. The types of flat display panel can be sorted into a plasma display and a liquid crystal display according to different display technologies. The plasma display is mainly applied to a large-size thin TV, but the applications of the liquid crystal display include various kinds of display devices. For example, in current electrical products, from large-size thin TVs and personal computer displays to the small-size displays set up on mobile phones, digital cameras and mobile music-playing devices, all almost use liquid crystal display panels.

Refer to FIGS. 1-3. FIGS. 1-3 are schematic diagrams illustrating a conventional liquid crystal display panel. FIG. 1 is an appearance illustrating the conventional liquid crystal display panel. FIG. 2 is a top view illustrating the conventional liquid crystal display panel. FIG. 3 is a side view illustrating the conventional liquid crystal display panel. As shown in FIGS. 1-3, the conventional liquid crystal display panel 10 comprises a first substrate (array substrate) 12, a second substrate (color filter substrate) 14 adhered to the first substrate 12, and liquid crystal molecules (not shown in figure) disposed between the first substrate 12 and the second substrate 14. In addition, the upper surface of the first substrate 12 and the lower surface of the second substrate 14 are individually disposed on an upper polarizer 16 and a lower polarizer 18.

In general, the size of the first substrate 12 is larger than that of the second substrate 14, wherein the overlap region between the first substrate 12 and the second substrate 14 is a display region 20 for displaying images, and the region of the first substrate 12 not covered by the second substrate 14 is peripheral region 22 for connecting to external circuits. As shown in FIGS. 1-3, the material of the first substrate 12 is glass, and the peripheral region 22 is not covered by the second substrate 14 so that the structural strength of the peripheral region 22 is weaker than the display region 20 covered by the second substrate 14. In this condition, the peripheral region 22 has a problem of easily breaking, especially for two corner parts of the peripheral region 22. For example, when performing a packaging process of the driving IC or a drop test for a small-size panel, the peripheral region 22 of the first substrate 12 often has a condition of breaking because the structural strength is weaker.

SUMMARY OF THE INVENTION

It is an objective of the present invention to provide a flat display panel having a design for strengthening the structure.

According to a preferred embodiment of the present invention, a flat display panel is provided. The flat display panel comprises a first substrate and a second substrate adhered to the first substrate. The first substrate comprises a display region and a peripheral region located on at least one side of the first substrate. The peripheral region comprises a driving IC connection region. The second substrate has an indentation portion facing to the driving IC connection region.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
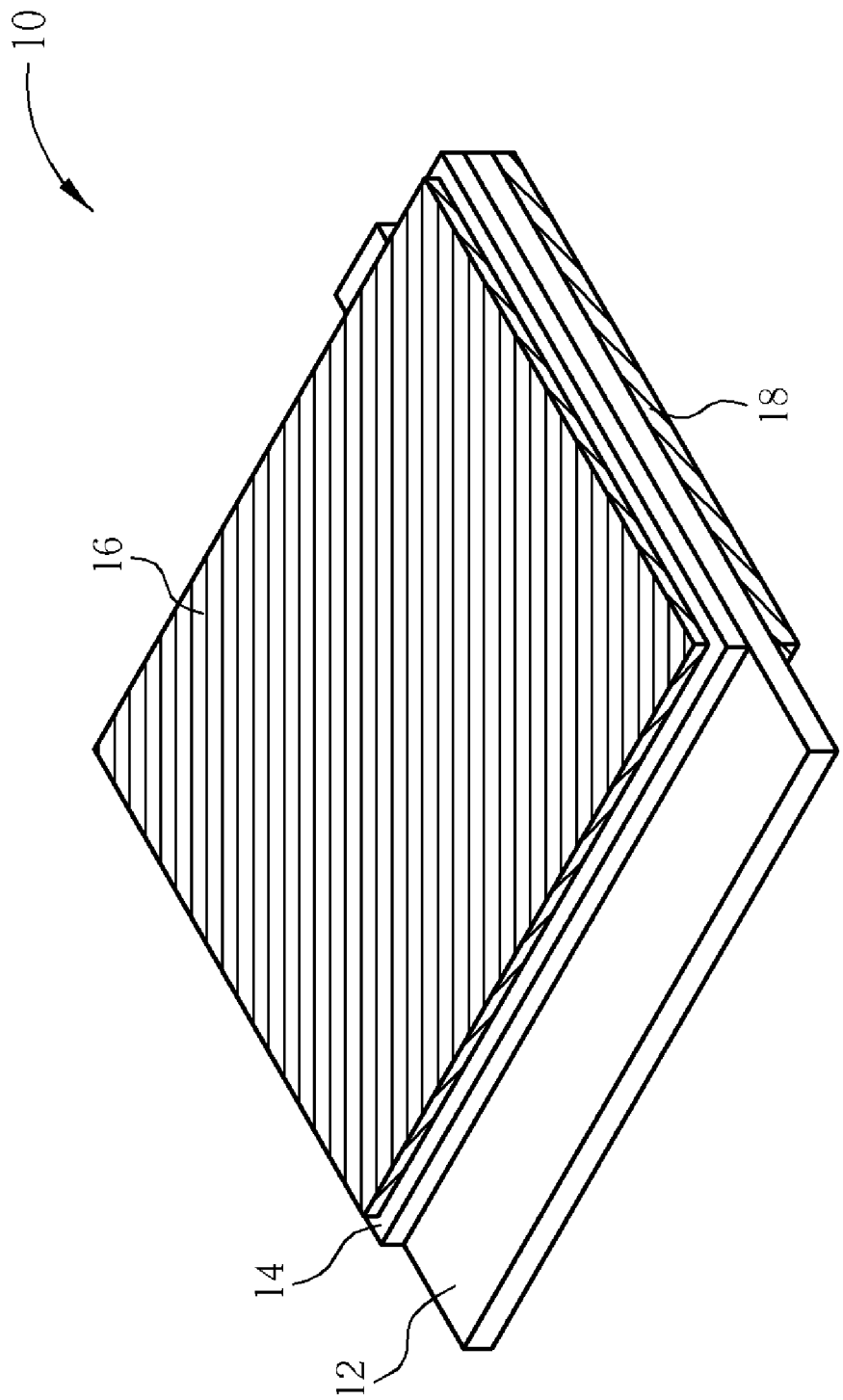
FIGS. 1-3 are schematic diagrams illustrating a conventional liquid crystal display panel.
Figure 2:
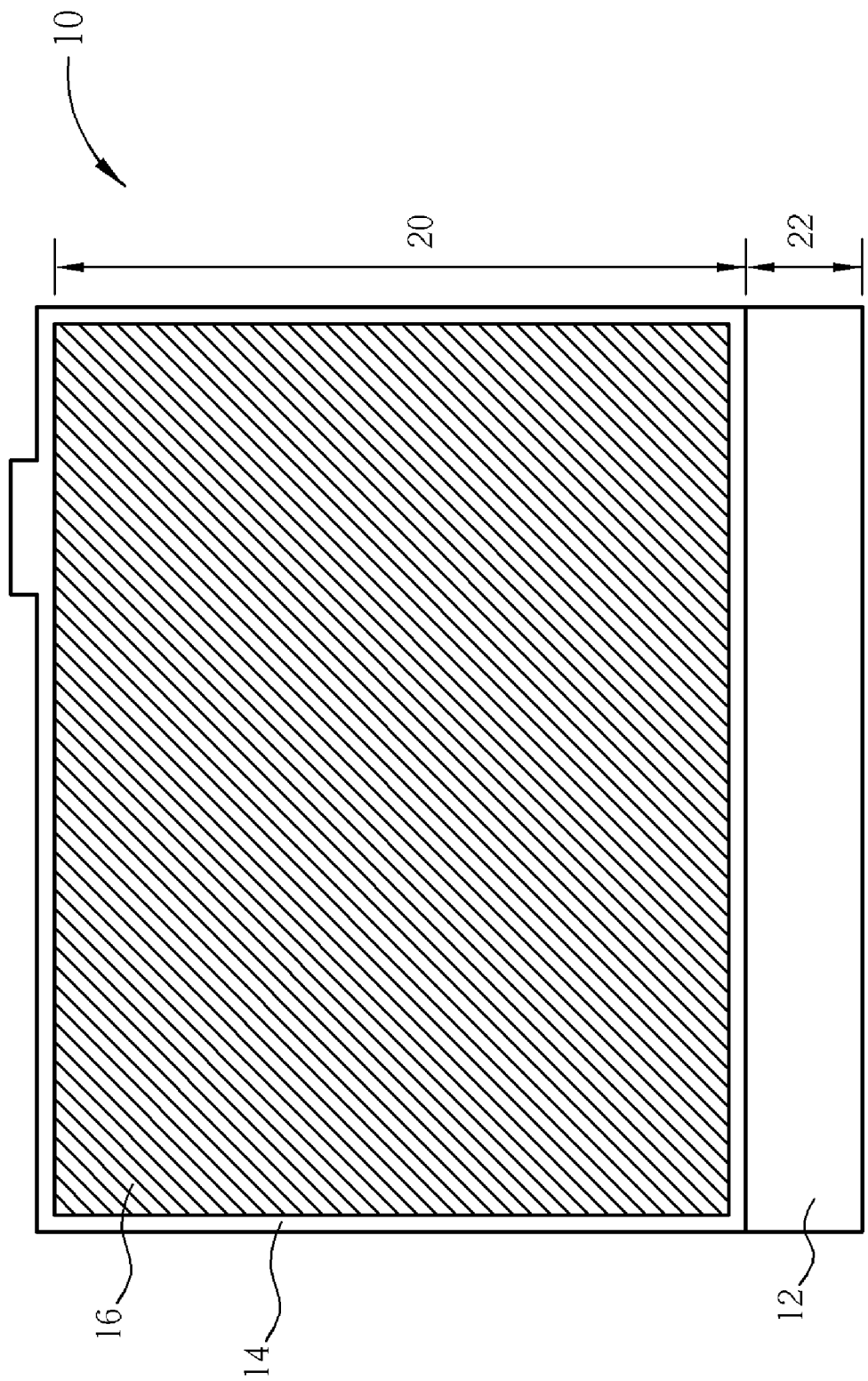
Figure 3:
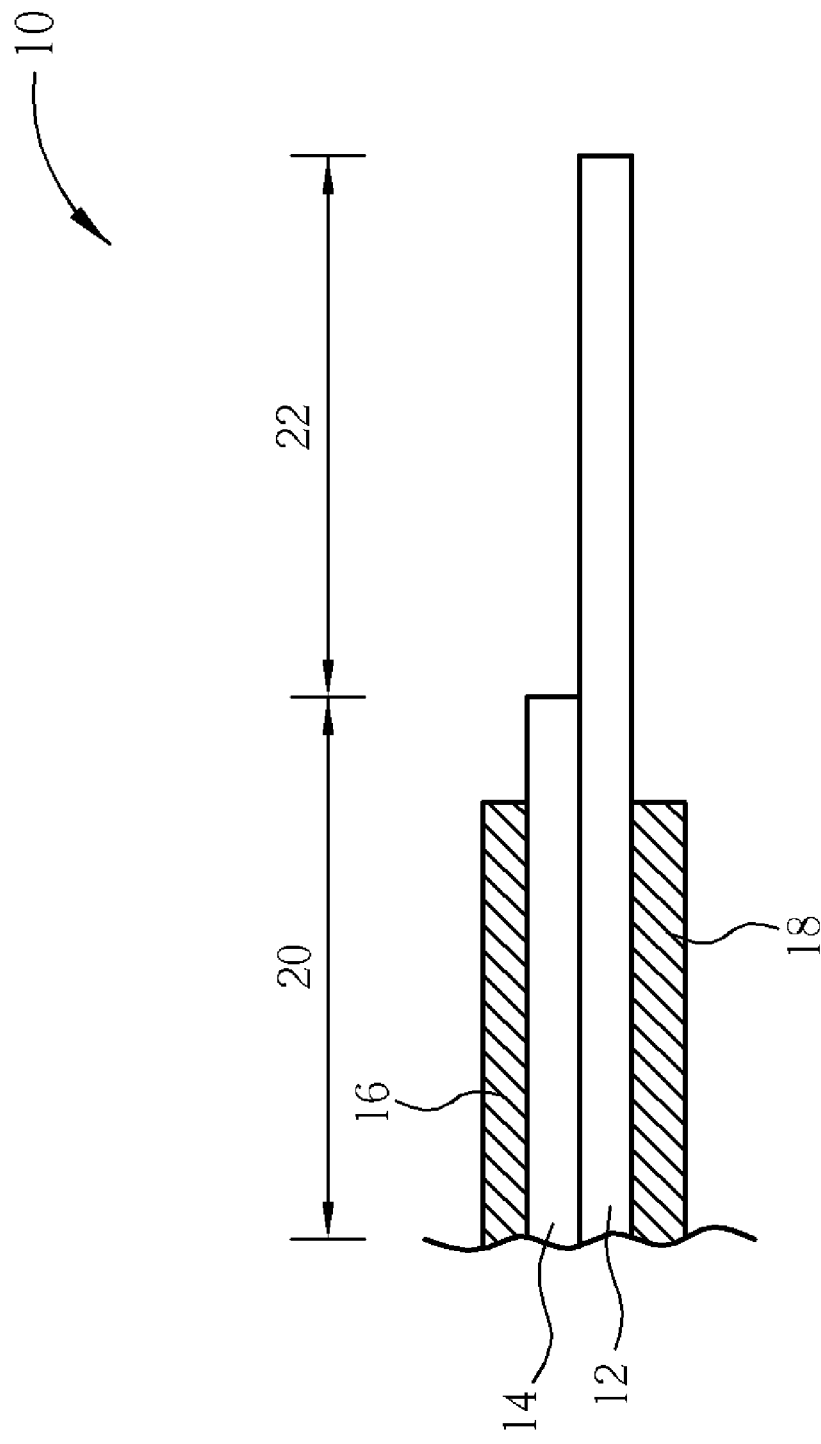
Figure 4:
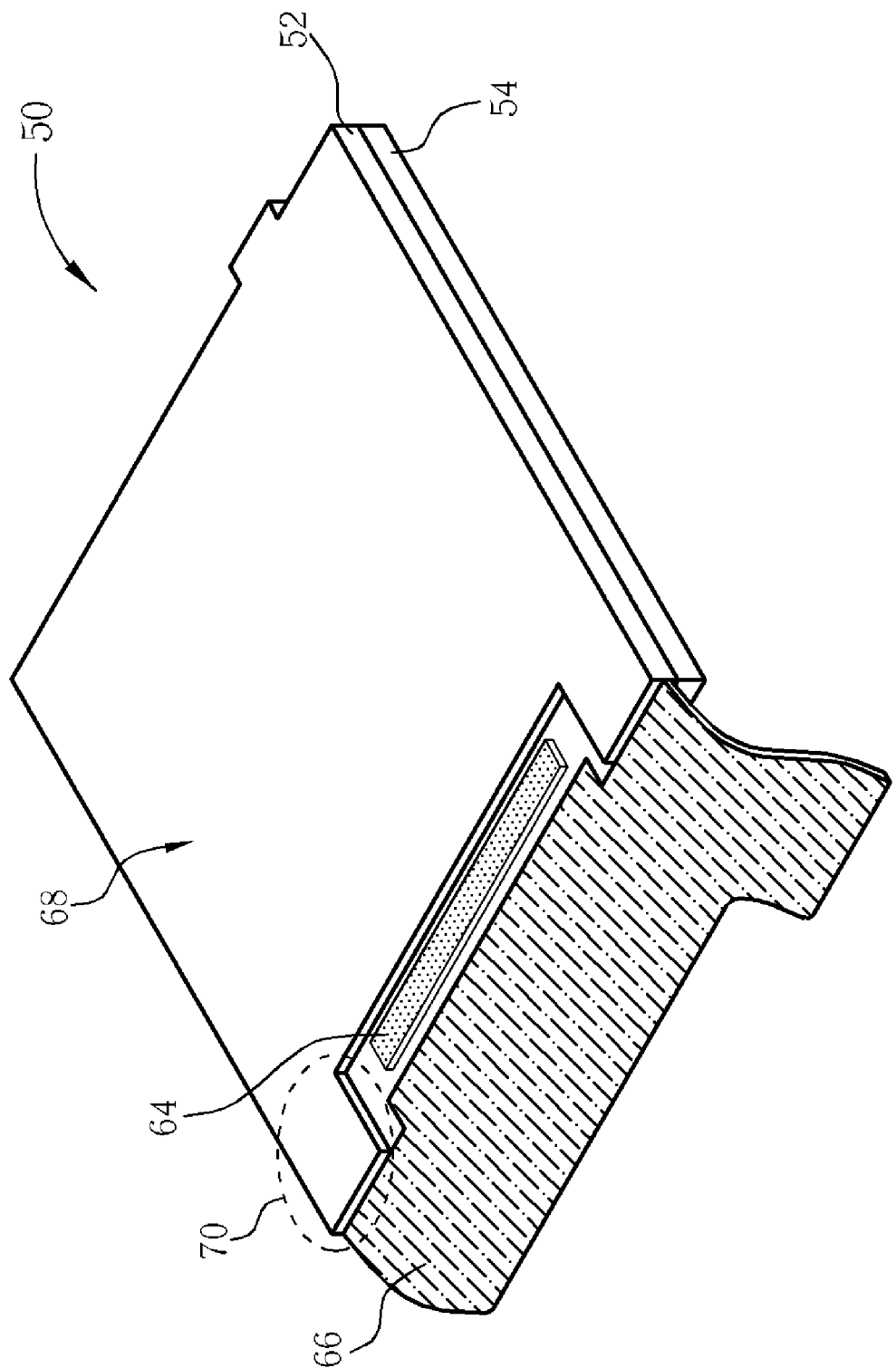
FIGS. 4-6 are schematic diagrams illustrating a flat display panel according to a preferred embodiment of the present invention.
Figure 5:
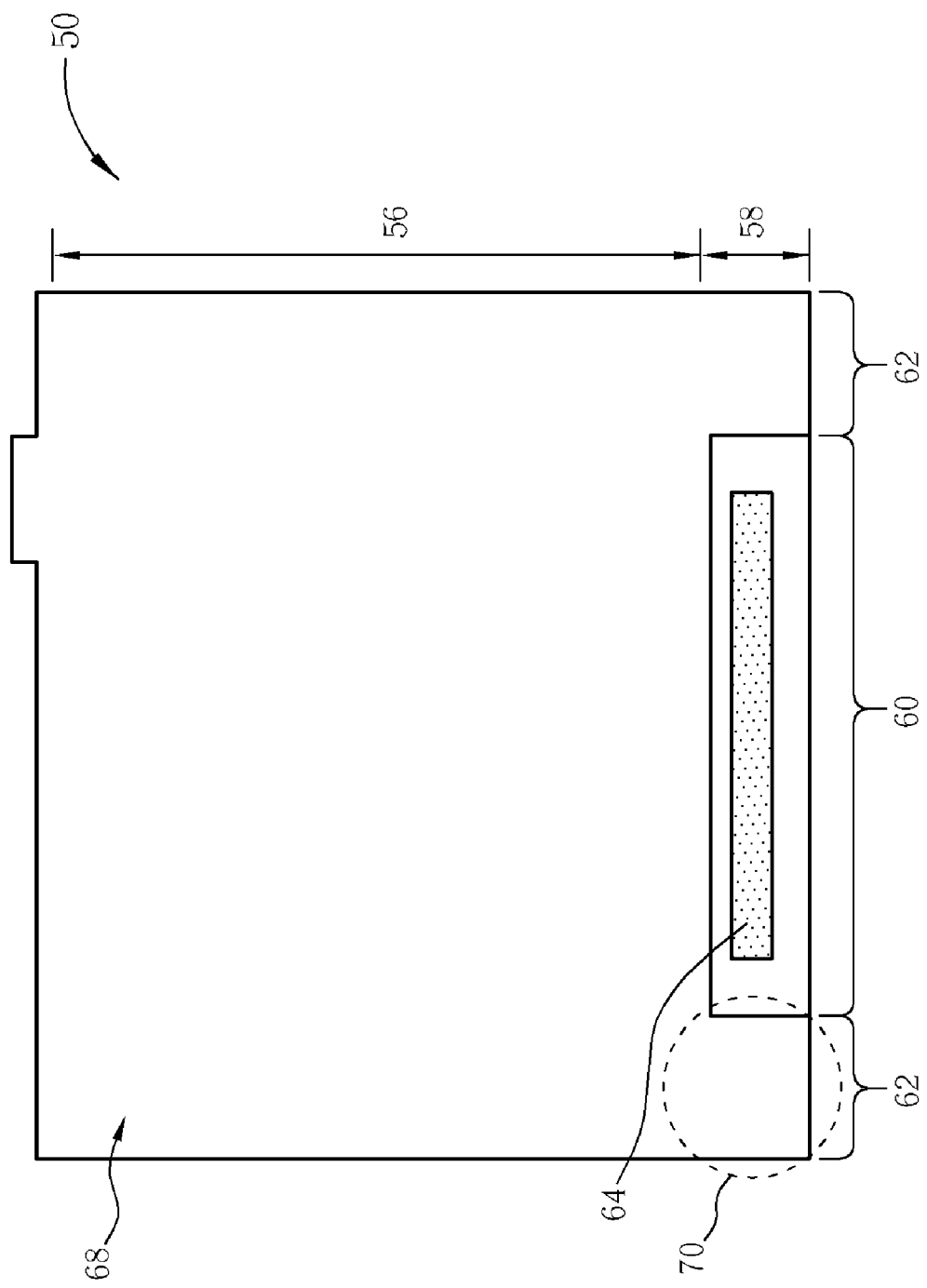
Figure 6:
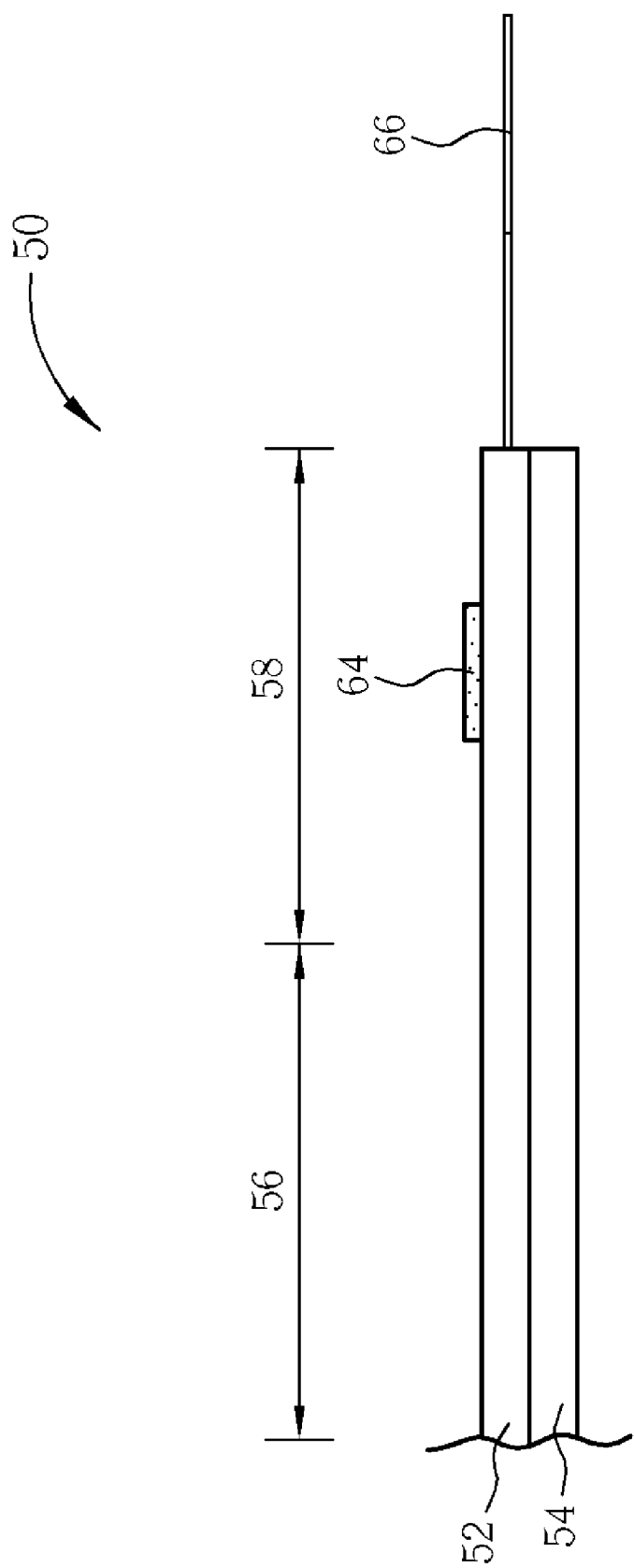

Refer to FIGS. 4-6. FIGS. 4-6 are schematic diagrams illustrating a flat display panel according to a preferred embodiment of the present invention. FIG. 4 is an appearance illustrating the flat display panel. FIG. 5 is a top view illustrating the flat display panel. FIG. 6 is a side view illustrating the flat display panel. Deserving to be mentioned, the structural design of the flat display panel according to the present invention is not limited to a specific display panel and can be applied to a liquid crystal display panel, an organic electroluminescent display panel or a plasma display panel, and so forth. As shown in FIGS. 4-6, the flat display panel 50 of this embodiment comprises a first substrate 52 and a second substrate 54 adhered to the first substrate 52. The first substrate 52 is a lower substrate of the flat display panel, also called an array substrate or thin film transistor substrate. The second substrate 54 is an upper substrate. If the flat display panel is a liquid crystal display panel, the upper substrate also can be called a color filter substrate. In addition, the material of the first substrate 52 and the second substrate 54 is glass or quartz, etc.

The first substrate 52 comprises a display region 56 for displaying images and a peripheral region 58 located on at least one side of the first substrate 52. The peripheral region 58 comprises a driving IC connection region 60 and two corner regions 62, wherein a driving IC 64 is disposed on the driving IC connection region 60, and the driving IC 64 is electrically connected to external circuits (not shown in the figures) by a flexible print circuit board 66 (not shown in FIG. 5).

The second substrate 54 comprises a main region 68 corresponding to and covering the display region 56 of the first substrate 52 and two extension regions 70 individually corresponding to and covering the two corner regions 62 of the peripheral region 58. The main region 68 and the extension regions 70 of the second substrate 54 do not cover the driving IC connection region 60 of the peripheral region 58.

As the above-mentioned, because the structural strength in the corner regions 62 of the peripheral region 58 is weaker, the second substrate 54 of this embodiment has the two extension regions 70 so as to strengthen the peripheral region 58 of the first substrate 52, especially for the structural strength of the corner regions 62, by using the extension regions 70 to cover and to be adhered to the corner regions 62 of the first substrate 52. Deserving to be mentioned, because the driving IC 64 and the flexible print circuit board 66 are disposed on the driving IC connection region 60 of the first substrate 52, the corner regions 62 of the first substrate 52 have no connection to the external circuits so that the extension regions 70 of the second substrate 54 having a function for strengthening structure that cover the corner regions 62 will not affect the packaging of the flat display panel 50.

As shown in FIGS. 4-6, each extension region 70 of this embodiment is a rectangular protrusion. A side of the rectangular protrusion is connected to the main region 68, and another two sides of the rectangular protrusion substantially are tangent to the edges of the corner regions 62. A substantially right angle is formed between the other side of the rectangular protrusion and a side of the main region 68. In this embodiment, the edge of the rectangular protrusion substantially is tangent to the edge of the corresponding corner region 62. However, the present invention is not limited by this embodiment, and depending on requirements, the edges of the rectangular protrusion also may not be tangent to the edge of the corner regions 62.

Figure 7:
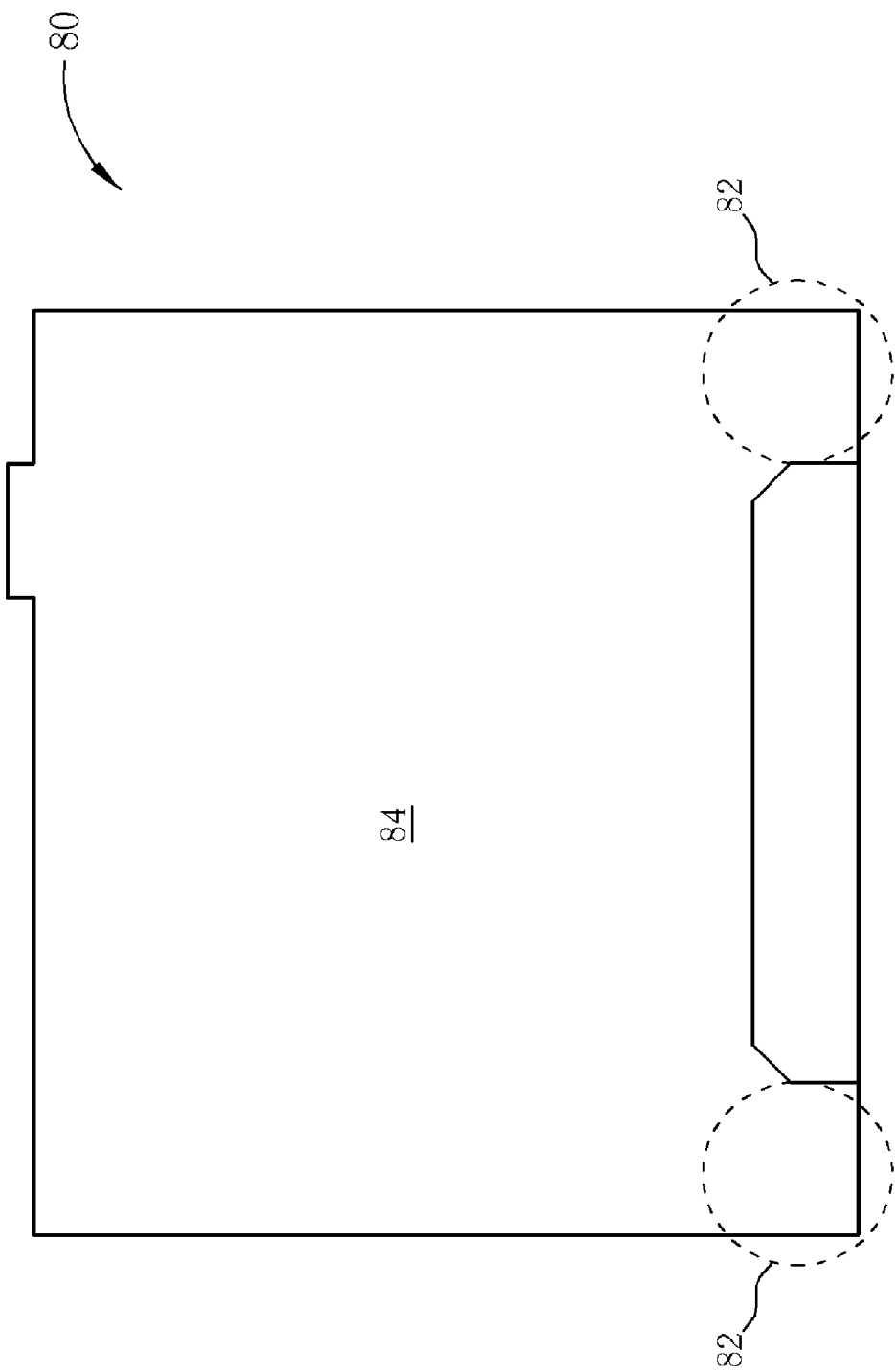
FIGS. 7-13 are top views illustrating a flat display panel according to other embodiments of the present invention.

According to the above-mentioned embodiment, the extension regions 70 of the second substrate 54 cover the corner regions 62 of the first substrate 52 so that the structural strength of the flat display panel 50 can be strengthened to effectively prevent breakage. Note that shape, number and position of the extension regions 70 of the second substrate 54 are not limited by the above-mentioned embodiment, and the extension regions 70 can have other shapes. Refer to FIGS. 7-13. FIGS. 7-13 are schematic diagrams illustrating top views of the flat display panel according to another embodiments of the present invention. The following description only illustrates the differences between the following embodiments and the above-mentioned embodiment, and the same device will not describe again. Compared with the above-mentioned embodiment, the difference is that the flat display panel of this embodiment has a design of chamfers. As shown in FIG. 7, the extension region 82 of the flat display panel 80 of this embodiment is a rectangular protrusion, and a side of the rectangular protrusion and the main region 84 form a chamfer.

Figure 8:
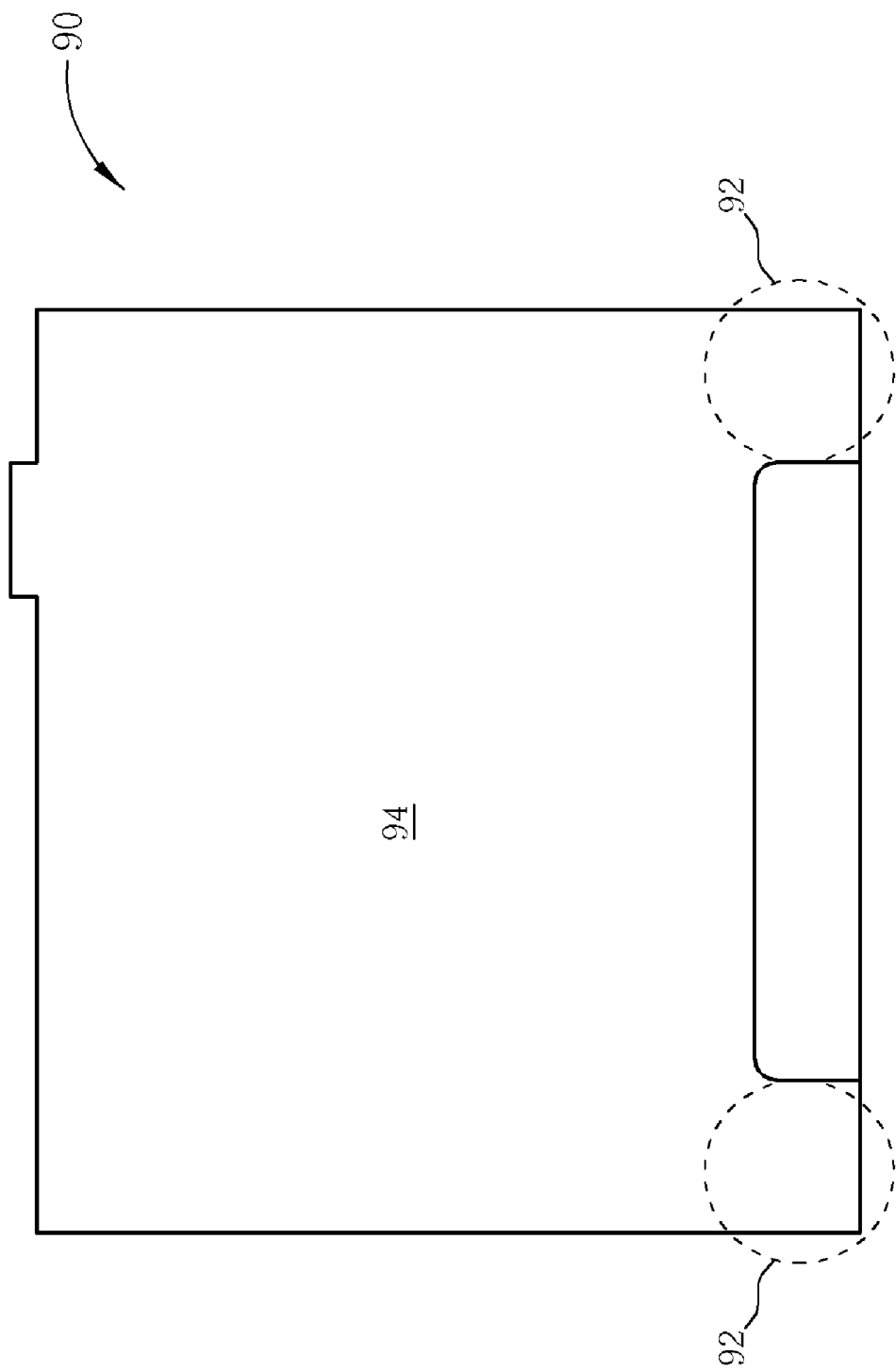

The difference between an embodiment of FIG. 8 and the above-mentioned embodiment is that the flat display panel has a design of fillets. As shown in FIG. 8, the extension region 92 of the flat display panel 90 of this embodiment is a rectangular protrusion, and a side of the rectangular protrusion and the main region 94 form a fillet.

Figure 9:
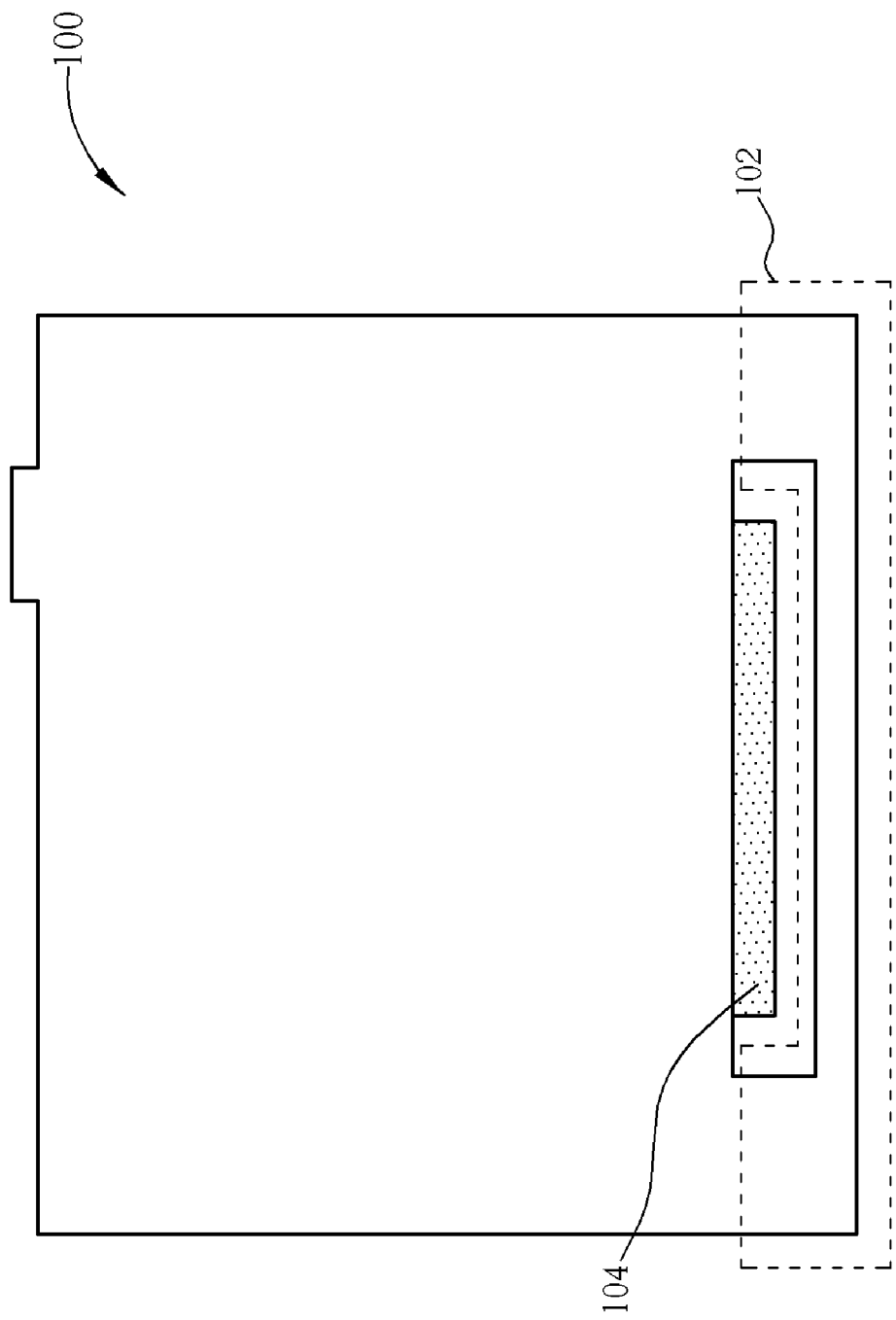

As shown in an embodiment of FIG. 9, the extension regions 102 of the flat display panel 100 surrounds the driving IC 104 and do not cover the driving IC 104.

Figure 10:
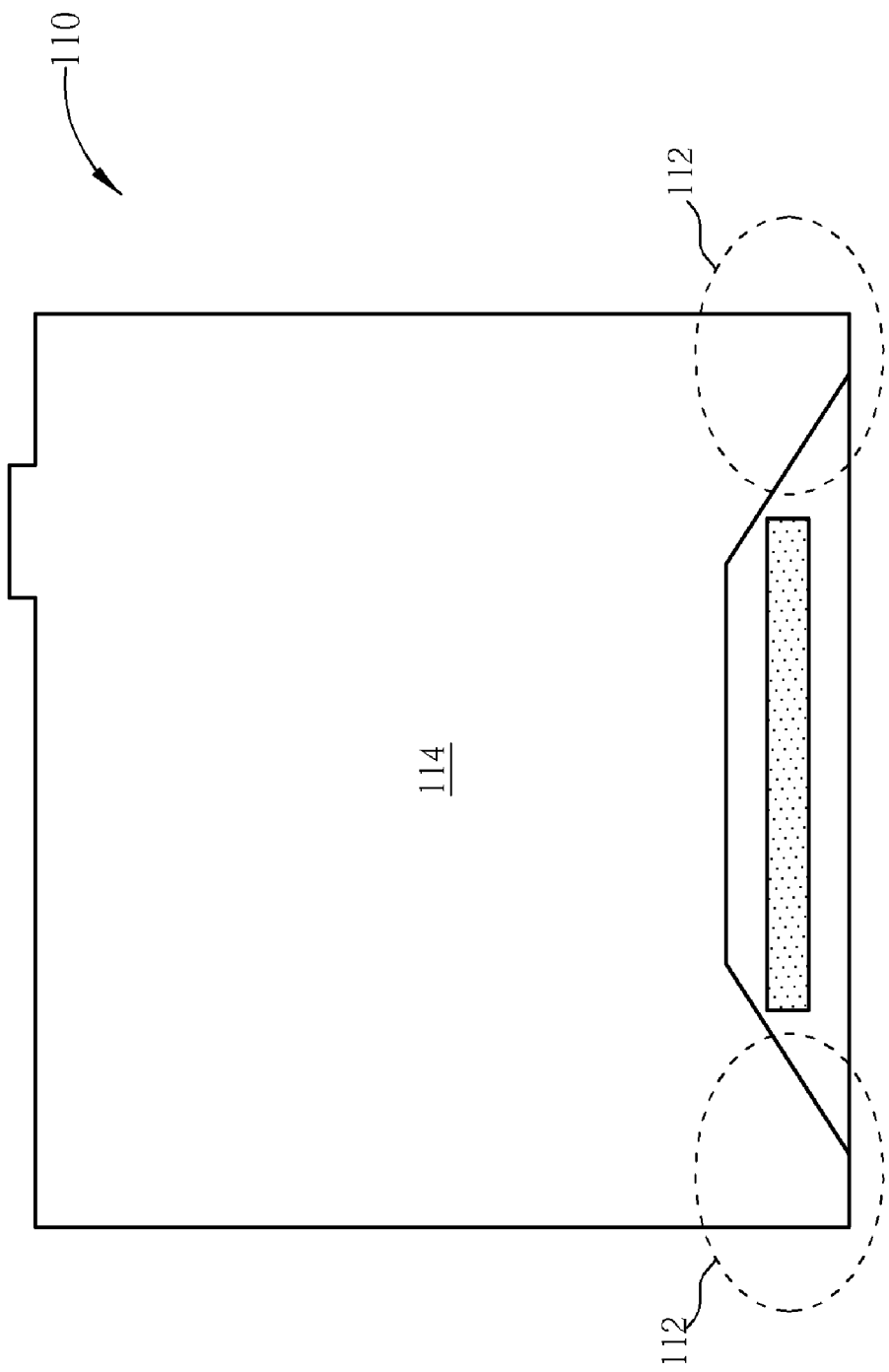

As shown in an embodiment of FIG. 10, each of two extension regions 112 of the flat display panel 110 is a trapezoid protrusion, and protruding from the main region 114.

Figure 11:
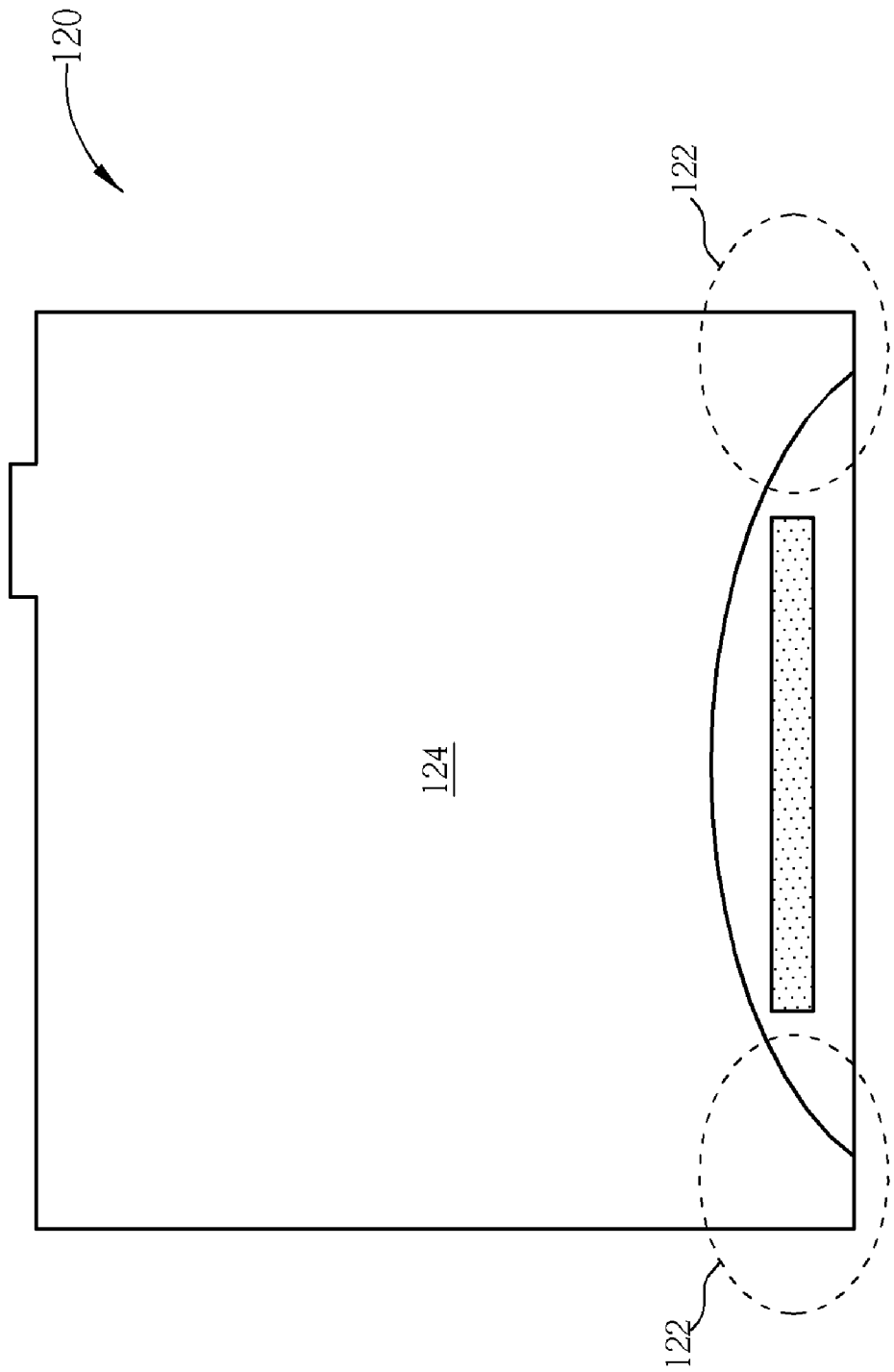

As shown in an embodiment of FIG. 11, the extension region 122 of the flat display panel 120 is an irregularly shaped protrusion, and protruding from the main region 124.

Figure 12:
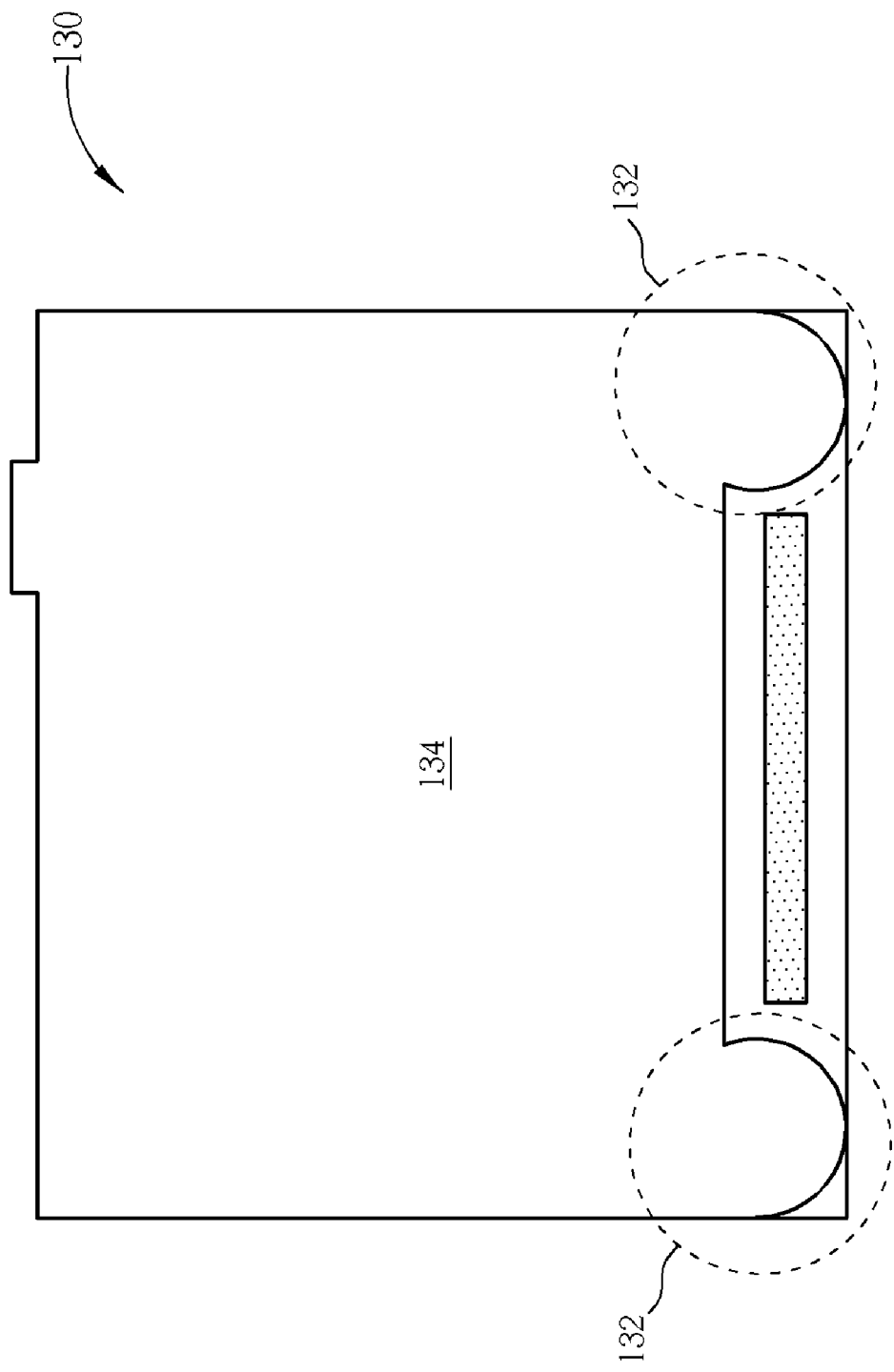

As shown in an embodiment of FIG. 12, each of two extension regions 132 of the flat display panel 130 is a semi-circular protrusion, and protruding from the main region 134.

Figure 13:
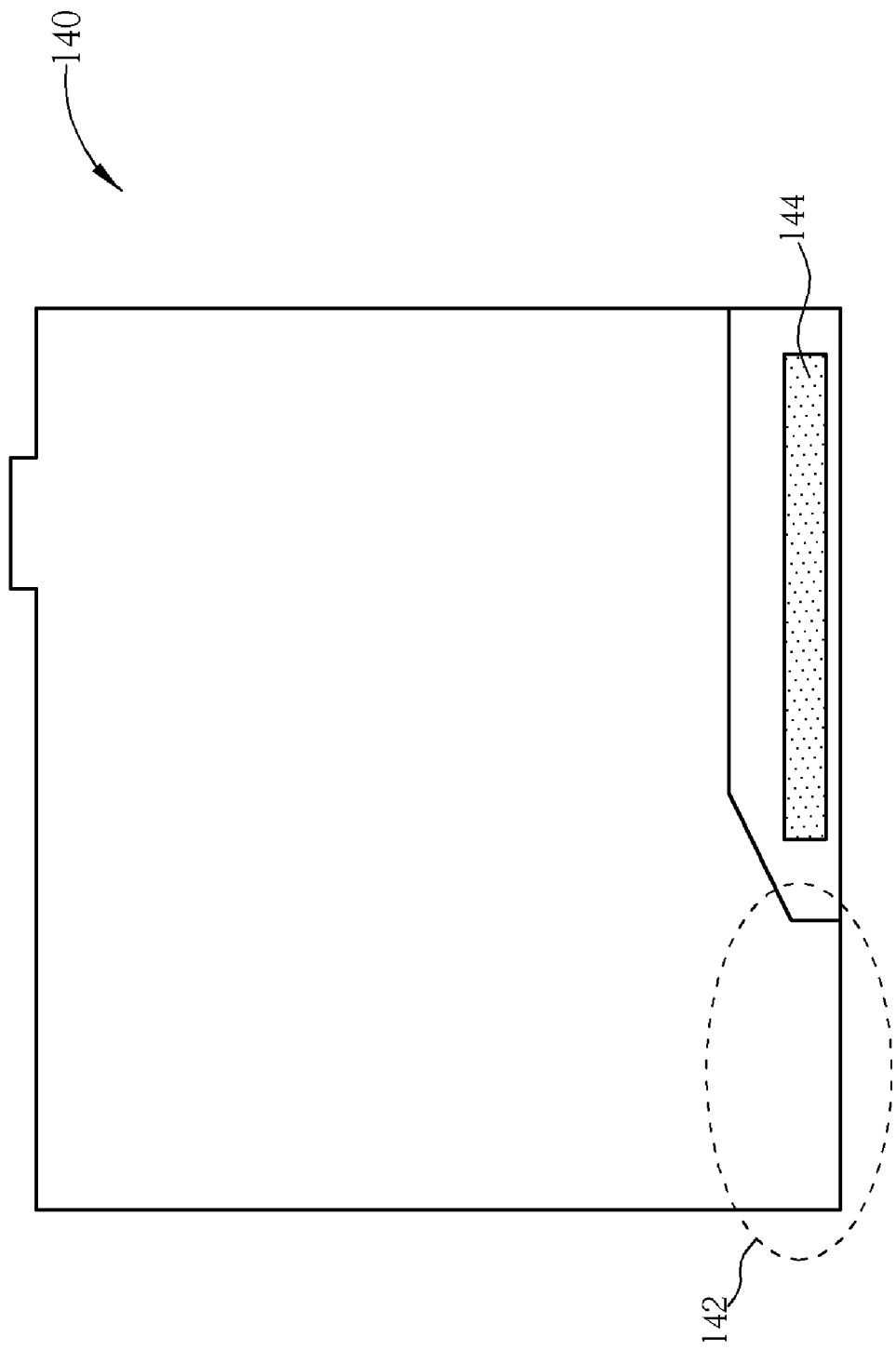

As shown in an embodiment of FIG. 13, the driving IC 144 of the flat display panel 140 is disposed on a side of the peripheral region of the first substrate, not center, and the second substrate only comprises a extension region 142 disposed on the other side of the peripheral region corresponding to the driving IC 144.

In summary, the flat display panel of the present invention uses the extension regions of the second substrate (upper substrate) to cover the corner regions of the peripheral region of the first substrate (lower substrate), so the structural strength can be enhanced to reduce the risk of breakage of the flat display panel without affecting the packaging of the flat display panel. Deserving to be mentioned, the extension regions of the second substrate are not limited to be disposed on the specific position corresponding to the first substrate. In the presupposition of not affecting the connection of the driving IC to external circuitry, position, shape or number of the extension regions can be any kind of the disclosure of the above-mentioned embodiments, and the design of the extension regions also can be changed appropriately in the presupposition of not affecting the connection of the driving IC to external circuitry.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat display panel, comprising:
   a first substrate comprising a display region and a peripheral region located on at least one side of the first substrate, the peripheral region comprising at least one driving IC connection region;
   a second substrate adhered to the first substrate, having an indentation portion facing to the driving IC connection region; and
   a driving IC disposed in the driving IC connection region, wherein the driving IC is located inside the indentation portion of the second substrate;
   wherein the driving IC connection region of the peripheral region is not covered with the second substrate.

2. The flat display panel of claim 1, wherein the second substrate comprising a main region corresponding to and covering the display region of the first substrate, and at least one extension region protruding from the main region of the second substrate and covering a portion of the peripheral region.

3. The flat display panel of claim 2, wherein an included angle is formed between a side of the protrusion and a side of the main region.

4. The flat display panel of claim 3, wherein the included angle is substantially a right angle.

5. The flat display panel of claim 2, wherein a side of chamfer is formed between a side of the protrusion and a side of the main region.

6. The flat display panel of claim 2, wherein a fillet is formed between a side of the protrusion and a side of the main region.

7. The flat display panel of claim 1, wherein the first substrate comprises a glass substrate.

8. The flat display panel of claim 1, wherein the second substrate comprises a glass substrate.

9. The flat display panel of claim 1, wherein the flat display panel comprises a liquid crystal display panel, an organic electroluminescent display panel, or a plasma display panel.

* * * * *